United States Patent
Miller

(10) Patent No.: US 6,179,371 B1
(45) Date of Patent: Jan. 30, 2001

(54) MOTOR VEHICLE WALL PRODUCT AND RELATED METHOD

(75) Inventor: Leland R. Miller, Oconomowoc, WI (US)

(73) Assignee: Fiberesin Industries, Inc., Oconomowoc, WI (US)

( * ) Notice: Under 35 U.S.C. 154(b), the term of this patent shall be extended for 0 days.

(21) Appl. No.: 09/161,182

(22) Filed: Sep. 25, 1998

(51) Int. Cl.$^7$ ................................................. B60R 27/00
(52) U.S. Cl. ................................................ 296/191; 296/156
(58) Field of Search ................................ 296/191, 156, 296/164, 901; 52/481.1; 428/537.5; 442/180, 297, 299

(56) References Cited

U.S. PATENT DOCUMENTS

| | | | |
|---|---|---|---|
| 2,376,653 | 5/1945 | Boyer | 154/45.9 |
| 3,003,810 | 10/1961 | Kloote et al. | 296/31 |
| 3,635,515 | * 1/1972 | White et al. | 296/164 |
| 3,661,099 | 5/1972 | Shelor | 108/51 |
| 3,853,686 | * 12/1974 | Clendenin | 428/355 BL |
| 3,887,952 | * 6/1975 | Nicoll, Jr. | 114/357 |
| 4,082,882 | 4/1978 | Weinstein | 428/246 |
| 4,491,362 | 1/1985 | Kennedy | 296/183 |
| 4,705,716 | 11/1987 | Tang | 428/251 |
| 4,791,768 | 12/1988 | Crean | 52/309.11 |
| 5,068,001 | 11/1991 | Haussling | 156/222 |
| 5,068,139 | 11/1991 | McReynolds | 428/215 |
| 5,279,089 | 1/1994 | Gulur | 52/309.11 |
| 5,422,168 | 6/1995 | O'Dell et al. | 428/211.1 |
| 5,899,037 | * 5/1999 | Josey | 52/267 |
| 5,989,668 | * 11/1999 | Nelson et al. | 428/50 |

\* cited by examiner

*Primary Examiner*—D. Glenn Dayoan
*Assistant Examiner*—Jason Morrow
(74) *Attorney, Agent, or Firm*—Jansson, Shupe, Bridge & Munger, Ltd.

(57) ABSTRACT

A motor vehicle sidewall product for use in making a recreational vehicle includes a fiberglass sheet having first and second surfaces. A bonding sheet adheres to the second surface and such sheet comprises between 25% and 60% resin and between 75% and 40% paper. The bonding sheet may be a natural bonding sheet having, ideally, between 38% and 42% resin and between 62% and 58% paper. Or the bonding sheet may be a compressed bonding sheet made of two or more sheet components adhering together and comprising between 25% and 44% resin and between 75% and 56% paper, ideally between 40% and 42% resin and between 60% and 58% paper. Most preferably, the sidewall product is then rolled onto a storage roll. A method for making a motor vehicle sidewall product includes providing a fiberglass sheet having first and second surfaces, providing a bonding sheet of either of the types described above and adhering the bonding sheet and the second surface to one another. Following the adhering step, the product is rolled onto a storage roll. As the vehicle is being constructed, the sidewall may be "built up" by affixing a plurality of spaced-apart aluminum tubes to the bonding sheet and mounting insulation in the spaces.

24 Claims, 3 Drawing Sheets

MOTOR VEHICLE WALL PRODUCT AND RELATED METHOD

FIELD OF THE INVENTION

This invention relates generally to materials for applications such as walls in static structures and the like. More particularly, the invention relates to a wall for an over-the-road vehicle such as a vehicle of the general class known as recreational vehicles or "RVs."

BACKGROUND OF THE INVENTION

For virtually any enclosed structure having one or more walls exposed to weather, it is important that the structure walls retain their watertight integrity. And for many types of structures, maintenance of the appearance of the wall is important. When the wall is part of a static structure, the techniques and materials which provide watertight integrity and attractive, long-lasting appearance are known. But when the wall is part of the driver- and passenger-enclosing body of a type of motor vehicle, the techniques and materials have been found less than satisfactory.

U.S. Pat. No. 4,082,882 (Weinstein et al.), U.S. Pat. No 4,491,362 (Kennedy) and U.S. Pat. No. 4,791,768 (Crean) all disclose products useful in making motor vehicle bodies of one type or another. The Weinstein et al. patent discloses a multi-layer structure said to be useful in making truck walls or the like. In one version of the structure, its layers include, from the exterior inwardly, sheet acrylic, general purpose resin, fiberglass, plywood, general purpose resin, and fiberglass.

The Kennedy patent discloses a fiberglass body for a Jeep vehicle. In an embodiment, only the inner and outer rigid shells are fiberglass. Such shells have what the patent calls "close foam" insulation material, e.g., styrofoam or urethane, between them.

The Crean patent discloses a composite structure for mobile applications such as motorized coaches. The structure includes what the patent calls a second subassembly which, from the exterior inwardly, includes fiberglass exterior sheathing, a glue layer, a first substrate made of foam laminated between paper, another glue layer, and a relatively thick layer of plywood.

Commonly, recreational vehicles have sidewalls made differently than any of the arrangements described in the above-mentioned patents. Such RV sidewalls include a sheet of a fiberglass product, the smooth "finished" surface of which is exposed to weather, road grit and the like. An exemplary product is FILON™ gel-coated, semi-rigid fiberglass-reinforced polyester resin material, about 0.045 to 0.06 inches thick, available from Kemlite Company, Joliet, Ill.

A sheet of lauan plywood is bonded to the interior surface of the fiberglass using moisture-cured urethane or polyurethane reactive hotmelt. In lieu of such plywood, the fiberglass may have bonded thereto a particle board made in Europe.

Lengths of rectangular aluminum tube are spaced along and adhere to the plywood or to the particle board, as the case may be. In the finished RV, the tubes are generally vertical and are spaced horizontally. Other tubes are mounted horizontally across the top and bottom of the vertical tubes. In preferred practice, the tubes form a welded frame.

A slab of styrofoam insulation is placed into each space between adjacent pairs of tubes and is also glued to the plywood or particle board. And when considered from the outside inwardly, styrofoam insulation is between the plywood and the interior wall visible to passengers.

A problem with this construction arises from the fact that as the RV moves along the road, it "flexes." Moisture migrates inwardly, both through the wall/seal junction at resilient seals around doors and windows and, perhaps, at the junction of a side wall and another wall structure. Such moisture permeates the plywood layer, causing it to rot. Or, less likely, such moisture causes a failure in the adhesive used to make the plywood.

Significant moisture migration eventually evidences itself in a "wavy" or "bulgy" outer fiberglass surface and/or interior wall. In addition, the cellulosic fibers of the plywood may separate and in any event, the plywood retains moisture for a long period of time.

None of these eventualities is acceptable to the vehicle owner or, for that matter, to the manufacturer. As to the latter, an RV manufacturer may, in a single year, experience very-substantial warranty claims. Attending to such claims detracts from the main production effort and drives up costs.

Yet another characteristic of the aforedescribed vehicle wall construction relates to vehicle weight. Of course, any significant saving in vehicle weight translates into improved fuel economy, reduced tire wear and other advantageous results. As will become apparent, the invention helps achieve further weight reduction in the walls of recreational vehicles.

Yet another concern relating to existing RV wall construction is the diminishing availability of lauan plywood. Lauan is a rain forest product and if its use is not voluntarily diminished, perhaps markedly so, the exhaustion of the forest will force other approaches.

Still another concern relating to existing RV wall construction using the Europe-sourced particle board is that, to be given reasonable consideration by the seller, a buyer must order very substantial quantities. This ties up cash in inventory and, in view of the invention, is unnecessary. And delivery "lead times" are considerable.

A new motor vehicle wall product and related method which address characteristics and disadvantages of earlier products would be an important advance in this field of technology.

OBJECTS OF THE INVENTION

It is an object of the invention to provide a new motor vehicle wall product and related method that address problems and shortcomings of the prior art.

Another object of the invention is to provide a new motor vehicle wall product and related method which are particularly well suited for production processes involving recreational vehicles.

Another object of the invention is to provide such a product and method which help maintain the weather integrity of a motor vehicle wall.

Yet another object of the invention is to provide such a product and method which help maintain the appearance of a motor vehicle wall.

Another object of the invention is to provide such a product and method which help reduce warranty and maintenance costs relating to recreational vehicles.

Another object of the invention is to provide such a product and method which help reduce vehicle weight.

Still another object of the invention is to provide such a product and method which diminish use of lauan wood.

Another object of the invention is to provide such a product and method which helps avoid tying up valuable cash resources in inventory. How these and other objects are accomplished will become apparent from the following descriptions and from the drawings.

SUMMARY OF THE INVENTION

The invention involves a unique motor vehicle sidewall product made from existing constituents using, in significant part, existing equipment and providing remarkable, long-term benefits in RV construction. In general, the new product includes a fiberglass sheet having a first or exterior surface (exterior when the RV is completed) and a second, interior surface. A relatively thin bonding sheet adheres to the second surface and comprises between 25% and 60% resin and between 75% and 40% paper. While a sidewall with one such bonding sheet is serviceable, a highly preferred sidewall product has two such bonding sheets. A first bonding sheet adheres to the second surface of the fiberglass sheet and a second bonding sheet adheres to the second (interior) face of the first bonding sheet. And even more bonding sheets may be used.

In one preferred embodiment, the bonding sheet is a natural bonding sheet and comprises between 35% and 60% resin and between 65% and 40% kraft paper having interstices, thereby permitting the adhesive resin to penetrate the paper. The ideal natural bonding sheet comprises between 38% and 42% resin and between 62% and 58% paper. Such bonding sheet has first and second faces and the tensile strength of the sheet along the "Z" axis, i.e., along an axis generally perpendicular to the faces, is at least 200 p.s.i. and, more likely, in the range of 350 p.s.i. to 700 p.s.i. This compares to a tensile strength of between 60 p.s.i. to 150 p.s.i. for plywood and the commonly-used, Europe-sourced particle board. And the new wall product does not delaminate or deteriorate in the presence of water, even over very long periods of time, e.g., many months.

In another preferred embodiment, the bonding sheet is a compressed bonding sheet comprising plural components, e.g., first and second sheet components, adhering together. The compressed bonding sheet comprises between 27% and 44% resin and between 73% and 56% paper and, ideally, between 38% and 42% resin and between 62% and 58% paper. Irrespective of whether the compressed bonding sheet has two or more sheet components, its preferred thickness is about 0.016 inches or greater. And like the natural bonding sheet, the compressed bonding sheet has first and second faces and the tensile strength of such sheet along an axis generally perpendicular to the faces is at least 200 p.s.i. and, more likely, in the range of 350 p.s.i. to 700 p.s.i.

Another aspect of the invention involves a new motor vehicle wall made using the new wall product. Such product is used in combination with insulation, a plurality of wall ribs and an interior finishing product. The bonding sheet of the wall product which adheres to the fiberglass sheet is referred to as a first bonding sheet even though there may not be a second such sheet adhering to the first bonding sheet. When only a single bonding sheet is used, the insulation and ribs adhere to such first bonding sheet and define a finish bonding surface. Where more than a single bonding sheet is used, the insulation and ribs adhere to the inwardmost bonding sheet and define a finish bonding surface.

An interior finishing product adheres to the finish bonding surface, such finishing product including a finish bonding sheet adhering to the finish bonding surface and a decorative vinyl lamination adhering to the finish bonding sheet.

A new method for making a motor vehicle sidewall product includes providing a fiberglass sheet having a first surface and a second surface, providing a bonding sheet comprising between 25% and 60% resin and between 75% and 40% paper and adhering the bonding sheet and the second surface to one another. In one variant of the method, the bonding sheet is a natural bonding sheet and comprises between 35% and 60% resin (ideally between 38% and 42% resin) and between 65% and 40% Kraft paper (ideally between 62% and 58% paper) and has interstices between. These tiny between-fiber spaces permit the adhesive resin to penetrate the paper.

In another variant of the method, the bonding sheet is a compressed bonding sheet and the step of providing the bonding sheet includes providing first and second sheet components impregnated with resin. The resin-wetted components are passed relatively rapidly through a drying oven so that such components dry but do not cure, i.e., the resin does not chemically cross-link. The components impregnated with now-dried-but-uncured resin are then laminated together by subjecting them simultaneously to heat and pressure. Under pressure, the Kraft paper fibers lose their identity, the interstices are eliminated and the components form a substantially homogeneous, cured compressed bonding sheet. Resin contents are as described above.

The fully laminated, fully cured compressed bonding sheet has first and second faces, and if desired, the pressing step is followed by the step of sanding at least the first face so that adhesive affixes well to such face. Most preferably, the sanding step (if used) includes sanding both faces so that the first face of the compressed bonding sheet adheres to the fiberglass and so that the wall ribs and the styrofoam insulation adhere to the second face.

It is to be appreciated that the wall product made using a fiberglass sheet and either type of bonding sheet may be made up as wall product roll stock. To make a sidewall assembly, the wall product is placed so that the exposed surface of the bonding sheet which is ultimately toward the vehicle interior is accessible for adhering a bonding sheet thereto. Most conveniently, the wall product is placed "fiberglass-sheet-down," i.e., so that the fiberglass sheet is between a support table and the bonding sheet—or, where two or more bonding sheets are used, between the support table and that bonding sheet most distant from the fiberglass sheet. In either variant of the method, the adhering step is followed by the step of adhering a wall rib to the second face of the exposed natural bonding sheet or the compressed bonding sheet, as the case may be.

Further details of the invention are set forth in the following detailed description and in the drawings.

DETAILED DESCRIPTION OF PREFERRED EMBODIMENTS

Figure 1:
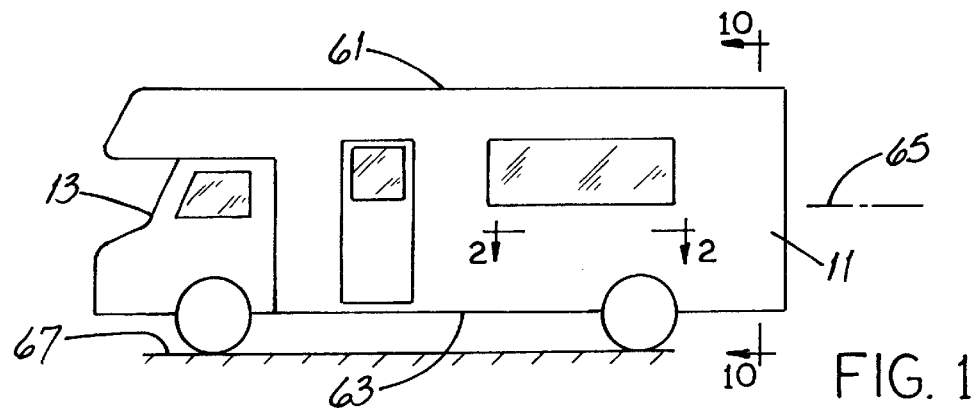
FIG. 1 is a representative elevation view of a recreational vehicle.

Before describing the new wall product 10, it will be helpful to have a general understanding of how the sidewall 11 of a recreational vehicle (RV) 13 is constructed using the new product. And the definitions near the end of this specification will also aid understanding.

Referring to FIGS. 1, 2, 3, and 4, the RV 13 has a sidewall assembly 11 which includes a fiberglass sheet 15 having a first or exterior surface 17 (exterior when the RV is completed) and a second, interior surface 19. A relatively thin bonding sheet 21, about 0.016–0.020 inches thick or somewhat greater, has its first face 23 affixed to the second surface 19 of the sheet 15 using, for example, a cross-linking adhesive 25 such as moisture-curing urethane, epoxy or a polyurethane reactive (PUR) hotmelt. An exemplary moisture-curing urethane is Morad 643 made by Morton International, Inc., Chicago, Ill., USA.

Ribs 27, embodied as rectangular aluminum tubes, are affixed to the second face 29 of the bonding sheet 21 using moisture-curing urethane as an exemplary adhesive 25. The ribs 27 are generally parallel to one another and generally vertical when the vehicle 13 is completely assembled.

A slab of styrofoam insulation 31 is placed into each space between and generally in contact with adjacent pairs of ribs 27 and is also affixed to the second face 29 of the bonding sheet 21 using, e.g., moisture-curing urethane. An interior wall member 33 is affixed to the ribs 27 and to the insulation 31 using, e.g., moisture-curing urethane. The wall member 33 is a known decorative vinyl laminated lauan plywood product.

Figure 4:
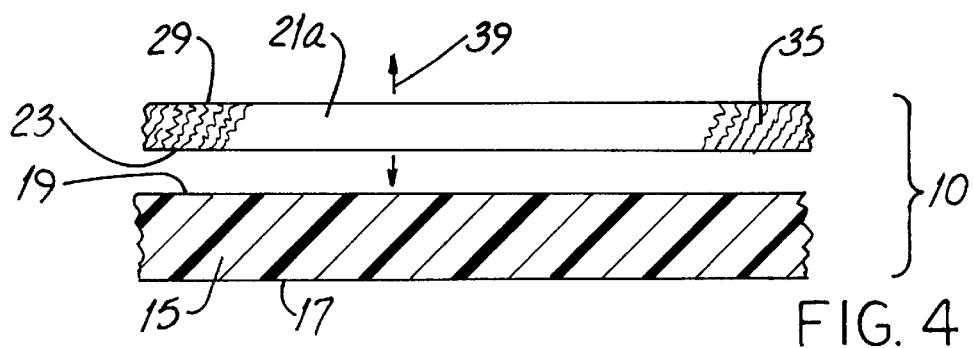
FIG. 4 is an exploded view of the wall product of FIG. 3. Parts are broken away.

Referring particularly to FIG. 4, in one embodiment, the bonding sheet 21 is a natural bonding sheet 21a made of a single sheet component comprising kraft paper having a basis weight in the range of 70 to 210 pounds. More preferably, the basis weight is in the range of 99 to 184 pounds and for a specific process and wall product 10, kraft paper having a basis weight of 156 pounds is ideal. (when referring to paper, the basis weight is the weight per 3000 square feet of untreated, i.e., non-impregnated, paper. Thus, the thicker the paper, the higher the basis weight.)

The natural bonding sheet 21a, in single component form, is made by dipping the kraft paper in a solution of phenolic resin having, preferably, 50% to 75% resin solids. The preferred solvent is alcohol although water and water/alcohol mixtures may be used. After dipping (in a way which fully coats with resin the fibers forming the interstices 35), both sides of the paper are scraped lightly to remove excess resin solution. In the preferred continuous manufacturing process, the now-impregnated paper then continues into an oven at between 250° F. and 350° F. until the resin is dried and cured. (The resin is dry when the solvent is dissipated and the paper is non-tacky and is cured when the resin cross-links to establish a chemical and mechanical bond.)

In its dried, cured state, the natural bonding sheet 21a comprises, by weight, between 35% and 60% resin and between 65% and 40% kraft paper. The ideal natural bonding sheet comprises between 38% and 42% resin and between 62% and 58% paper.

Figure 5:
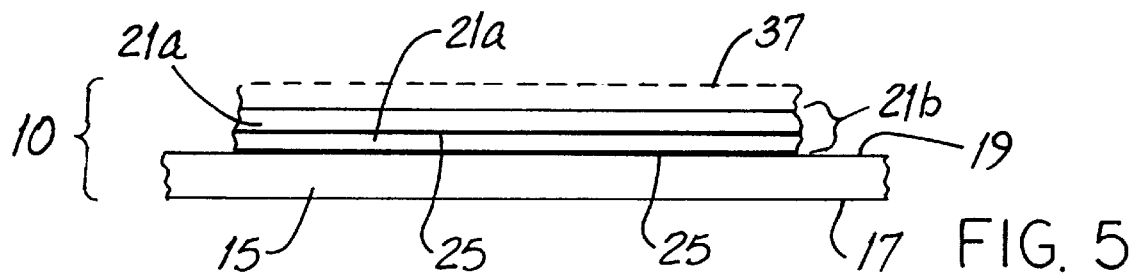
FIG. 5 is an edge view, i.e., a view generally from a perspective like that of FIG. 2, of one embodiment of the new wall product. Parts are broken away.

Referring also to FIG. 5, a highly preferred natural bonding sheet 21b includes plural natural bonding sheet components 21a, preferably two such components 21a. (The dashed line 37 represents that three or more components 21a may be used to make the natural bonding sheet 21b.) An exemplary adhesive 25 used to affix the fiberglass sheet 15 and the first face 23 of the natural bonding sheet 21b to one another and to affix the components 21a to one another is moisture-curing urethane. (It is apparent from the foregoing that in the embodiment of FIG. 4 involving but a single natural bonding sheet component 21a, such component 21a forms the sheet 21b.)

The tensile strength of the sheet 21b along the "Z" axis 39, i.e., along an axis generally perpendicular to the faces 23, 29, is at least 200 p.s.i. and, more preferably is, in the range of 350 p.s.i. to 700 p.s.i. This compares to a tensile strength of between 60 p.s.i. to 150 p.s.i. for plywood and the commonly-used, Europe-sourced particle board discussed above. (As is well known in the industry, tensile strength refers to the force required to be applied before the fibers separate and the sheet pulls apart.)

Figure 6:
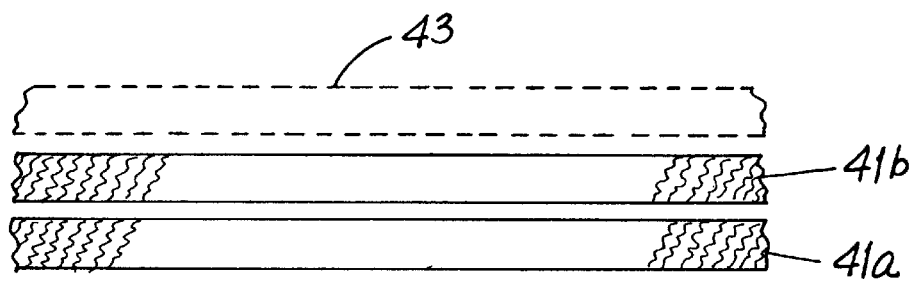
FIG. 6 is an edge view, i.e., a view generally from a perspective like that of FIG. 2, of plural compressed bonding components used to make another embodiment of the new wall product. The components are shown in spaced-apart relationship, parts are broken away and other parts are shown in dashed outline.
Figure 7:
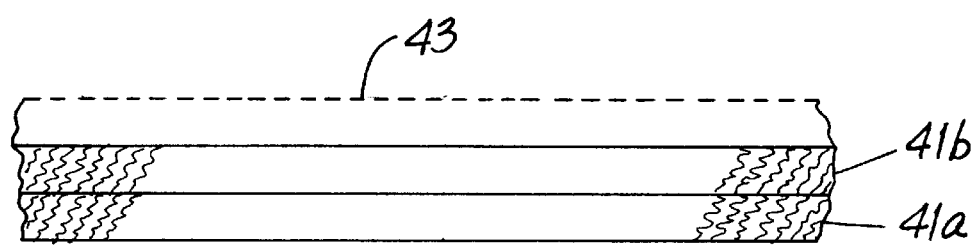
FIG. 7 is a view generally like that of FIG. 6 except showing the bonding components in contacting relationship. Parts are broken away and other parts are shown in dashed outline.
Figure 8:
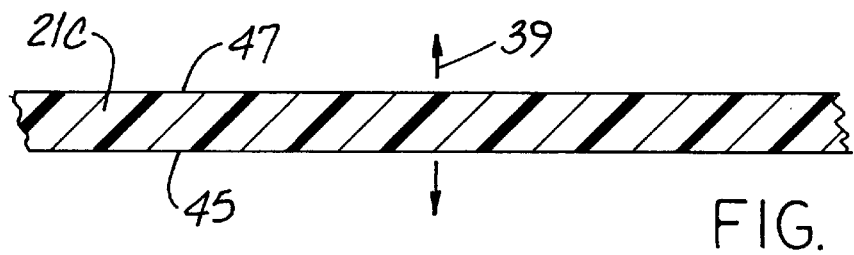
FIG. 8 is a view generally like that of FIG. 6 showing the compressed bonding sheet made from the bonding components of FIGS. 6 and 7.

Referring next to FIGS. 6, 7, and 8, in another preferred embodiment, the bonding sheet 21 is a compressed bonding sheet 21c comprising plural components, e.g., first and second sheet components 41a, 41b, adhering together. Each bonding sheet component 41a, 41b is impregnated in the manner described above for impregnating a natural bonding sheet component 21a. The impregnated paper is then placed in an oven at between 250° F. and 350° F., most preferably about 300–320° F., until the resin is dried but not cured. One way to achieve this result is to move the paper through the oven at a more rapid rate than that used to cure and dry the sheet which emerges from the oven as the natural bonding sheet component 21a. Using a more rapid "feed rate" results in drying but not curing. (In the industry, dried, uncured resin is often referred to as "B stage" resin. Less commonly, dried, cured resin is referred to as "C stage" resin.)

After the sheet components 41a, 41b are dried (but not cured), they are laid atop one another as shown in FIG. 7 and compressed in a press in the presence of heat. (The dashed lines in FIGS. 6 and 7 represent that three or more components like component 41a or 41b may be used to make the compressed bonding sheet 21c.)

Compression is at a pressure in the range of about 200 p.s.i. to about 1500 p.s.i. Since compression has a tendency to squeeze the resin out of the paper fibers, lower pressures should be used with components 41 having higher percentages of resin. Pressing temperature in the range of 260° F. to 340° F. is preferred. Most preferably, the temperature is about 285° F. when pressing begins and, because curing is exothermic, peaks at some higher temperature. Such pressing and curing causes the sheet components 41a, 41b to lose their identity and the interstices 35 to be collapsed as represented by the sequence of FIGS. 6, 7 and 8. That is, the sheet 21c is free of interstices 35. Then, as represented by FIG. 8, the compressed bonding sheet 21c closely resembles a homogeneous plastic sheet.

The compressed bonding sheet 21c comprises between 25% and 44% resin and between 75% and 56% paper. Most preferably, the sheet comprises between 38% and 42% resin and between 62% and 58% paper.

When, as in a very-specific process, kraft paper of 156 pound basis weight is used to make each compressed bonding sheet component 41a, 41b and when two such components 41a, 41b are used to make the compressed bonding sheet 21c, such sheet 21c is about 0.020–0.022 inches thick in its unsanded state. Most preferably (but not as a mandatory matter), the sheet 21c is sanded on both sides for better adhesion. The finished (sanded) sheet 21c is about 0.014–0.016 inches thick. And like the natural bonding sheet 21b, the compressed bonding sheet 21c has first and second faces 45, 47, respectively, and the tensile strength of such sheet 21c along an axis 39 generally perpendicular to the faces 45, 47 is at least 200 p.s.i. and, more preferably, in the range of 350 p.s.i. to 700 p.s.i.

Irrespective of whether the bonding sheet 21 is a natural bonding sheet 21b or a compressed bonding sheet 21c, the wall ribs 27 adhere to the second or interior face 29 or 47 of such sheet 21. That is, the motor vehicle sidewall 11 can be "built up" using the new sidewall product 10.

Figure 2:
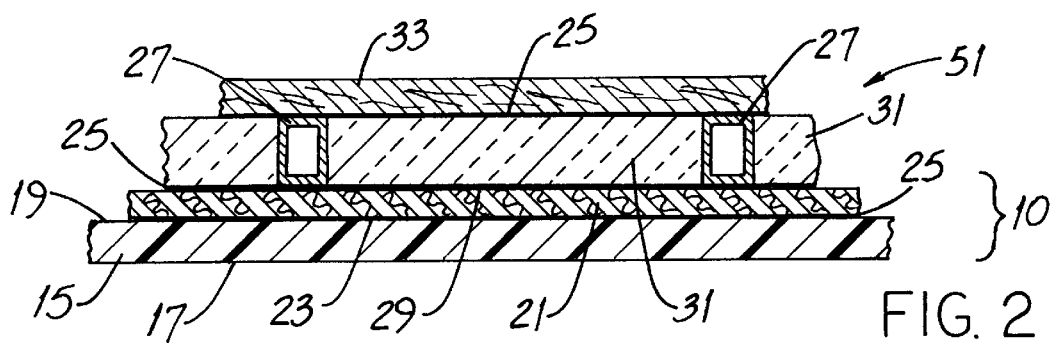
FIG. 2 is a top plan view of one embodiment of a new wall for a recreational vehicle, such view being taken along the viewing plane 2—2 of FIG. 1. Parts are broken away.
Figure 3:
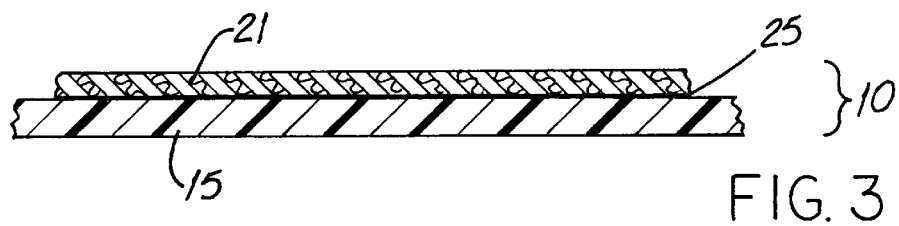
FIG. 3 is an edge view, i.e., a view generally from a perspective like that of FIG. 2, of the new wall product. Parts are broken away.
Figure 9:
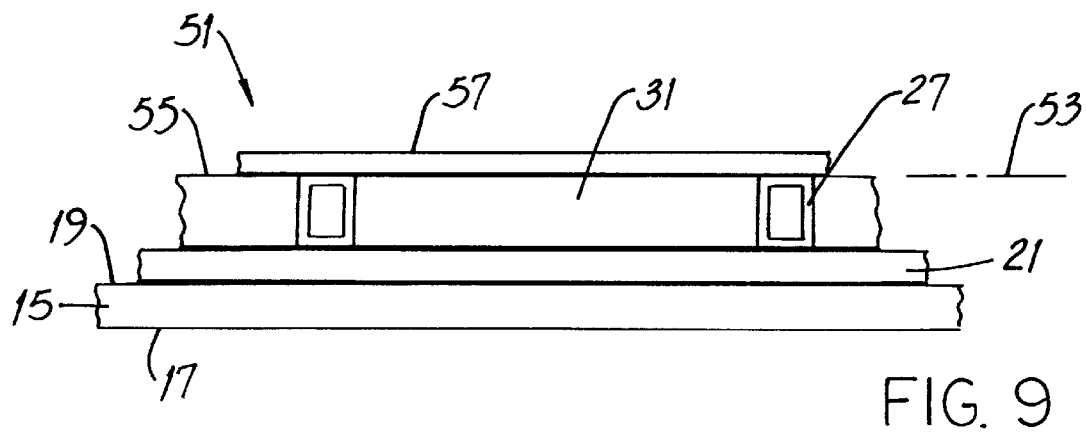
FIG. 9 is a view generally like that of FIG. 2 showing another embodiment of a new wall for a recreational vehicle.
Figure 11:
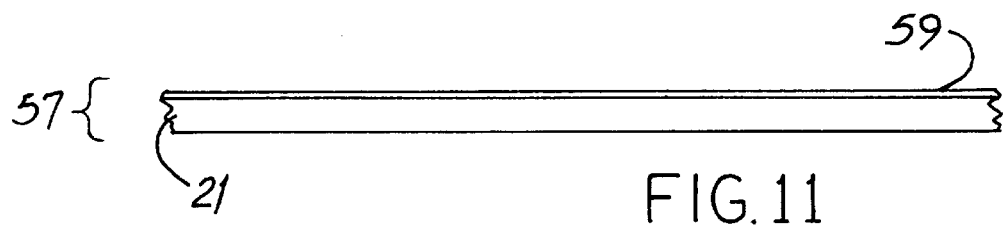
FIG. 11 is an edge view of an interior finishing product used with the embodiment shown in FIG. 9.

Referring also to FIGS. 2, 9 and 11, particularly FIGS. 9 and 11, another embodiment of a new motor vehicle wall 51 may be made using the new wall product 10. The latter includes the fiberglass sheet 15 having the first surface 17 and the second surface 19. A first bonding sheet 21 adheres to the second surface 19 and comprises between 25% and 60% resin and between 75% and 40% paper. The bonding sheet 21 may be a natural bonding sheet 21b or a compressed bonding sheet 21c as described above.

And as also described above, insulation 31 and a plurality of wall ribs 27 adheres to such sheet 21. Those surfaces of the insulation 31 and ribs 27 which are away from the fiberglass sheet 15 are generally coincident with a plane and define a finish bonding surface 55.

An interior finishing product 57 adheres to the finished bonding surface 55 and includes a second bonding sheet 21 adhering to the finished bonding surface 55. A thin decorative vinyl lamination 59 adheres to the second bonding sheet 21. In the embodiment of FIG. 9, the finishing product 57 replaces the wall member 33 mentioned above and shown in FIG. 2. (It is apparent from the foregoing that the finishing product 57 is free of wood, lauan or otherwise.)

Referring to the FIGURES, a new method for making a motor vehicle sidewall product 10 includes providing a fiberglass sheet 15 having a first surface 17 and a second surface 19, providing a bonding sheet 21 comprising between 25% and 60% resin and between 75% and 40% paper and adhering the bonding sheet 21 and the second surface 19 to one another. In one variant of the method, the bonding sheet 21 is a natural bonding sheet 21b and comprises between 35% and 60% resin (ideally between 38% and 42% resin) and between 65% and 40% kraft paper (ideally between 62% and 58% paper) and has interstices 35. The tiny between-fiber spaces permit the adhesive resin to penetrate the paper.

In another variant of the method, the bonding sheet 21 is a compressed bonding sheet 21c and the step of providing the bonding sheet 21 includes providing first and second bonding sheet components 41a, 41b impregnated with resin. The resin-wetted components 41a, 41b are passed relatively rapidly through a drying oven so that such components dry but do not cure. The components impregnated with now-dried-but-uncured resin are then laminated together by subjecting them in a press, simultaneously to heat and pressure. Under pressure, the kraft paper fibers lose their identity, the interstices 35 are eliminated and the components 41a, 41b form a substantially homogeneous, cured compressed bonding sheet 21c. Resin contents are as described above.

The fully laminated, fully cured compressed bonding sheet 21c has first and second faces 23, 29, and the pressing step is followed by the optional step of sanding at least the first face 23 so that adhesive 25 affixes well to such face 23. Most preferably, the sanding step includes sanding both faces 23, 29 so that the first face 23 of the compressed bonding sheet 21c adheres to the fiberglass sheet 15 and so that the wall ribs 27 and the styrofoam insulation 31 adhere to the second face 29.

It is to be appreciated that the fiberglass sheet 15 and either type of bonding sheet 21b or 21c may be made up as roll stock. Irrespective of whether the bonding sheet 21 is of the natural or compressed type, the wall product 10 is placed so that the surface 19 of the fiberglass sheet 15 (i.e., that surface ultimately toward the vehicle interior) is accessible for adhering a bonding sheet thereto. Most conveniently, the sheet 15 is placed "fiberglass side down."

It is to be appreciated that the wall product 10 may be made up as wall product roll stock for later use in making a sidewall assembly 11. To make a sidewall assembly 11, the wall product 10 is placed so that the exposed surface of the bonding sheet 21 which is exposed in the product 10 and ultimately toward the vehicle interior is accessible for adhering other assembly components thereto. Most conveniently, the wall product 10 is placed "fiberglass-sheet-down," i.e., so that the fiberglass sheet 15 is between a support table and the exposed bonding sheet 21. The adhering step is followed by the step of adhering a wall rib 27 to the second face 29 of the exposed natural bonding sheet component 21a, 21b or of the compressed bonding sheet component 21c, as the case may be.

It is also to be appreciated that the fiberglass sheet 15 is cut from long-strip roll stock which is available in several widths ranging from 36 inches to 108 inches. RV manufacturers prefer to procure the product in rolls up to 104 inches wide—such width is adequate to extend from the top 61 of the vehicle 13 to its bottom 63 and represents the widest product required, at least for RVs 13 currently in production. (When made up in roll stock, such product might more properly be referred to as a strip.) When the strip is used during manufacture of an RV 13, it is oriented so that the long axis 65 of the strip, perpendicular to the width, is parallel to the road 67 in the finished vehicle 13.

Figure 10:
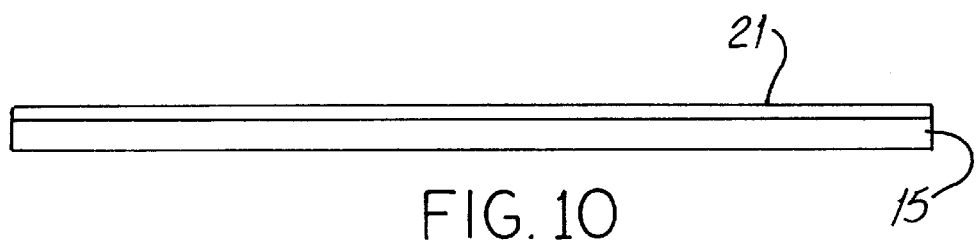
FIG. 10 is an edge view of the new wall product taken along the view plane 10—10 of FIG. 1 and showing the seam-free construction of such product.

Referring particularly to FIGS. 2 and 10, in a highly preferred method, wall product 10 and wall 51, the fiberglass sheet 15 and the bonding sheet 21 are oriented so that the resulting seam is parallel to the road in the finished vehicle. This is an important advantage since every vertical seam represents a flex line which reduces wall strength. And, of course, a wall product 10 which is free of seams is within the scope of the invention.

In racking load tests conducted in conformance with ASTM E 72-80, a wall section made in accordance with the invention exhibited an ultimate load rating from about 10% to about 40% higher than a wall section made in accordance with the prior art.

As used herein, the phrase "natural bonding sheet" means a bonding sheet which has not been subjected to compression. The phrase "compressed bonding sheet" means a bonding sheet which has been subjected to compression to the degree necessary to collapse between-fiber interstices while yet retaining sufficient resin in the sheet to fully bond fibers together throughout the thickness of the sheet.

While the principles of the invention have been shown and described in connection with preferred embodiments, it is to be understood clearly that such embodiments are by way of example and are not limiting.

What is claimed:

1. A motor vehicle wall product including:
   a fiberglass sheet having a first surface and a second surface; and
   a generally flat, bonding sheet having a first face, adhering to the second surface and a second face for adhering insulation and a wall rib thereto, such bonding sheet comprising, by weight, between 25% and 60% resin and between 75% and 40% paper.

2. The product of claim 1 wherein the bonding sheet is a natural bonding sheet and comprises, by weight, between 35% and 60% resin and between 65% and 40% kraft paper having interstices, thereby permitting an adhesive to penetrate the paper.

3. The product of claim 2 wherein the natural bonding sheet comprises, by weight, between 38% and 42% resin and between 62% and 58% paper.

4. The product of claim 2 wherein:
   the tensile strength of the natural bonding sheet along an axis generally perpendicular to the faces is at least 200 p.s.i.

5. The product of claim 4 wherein the tensile strength is in the range of 350 p.s.i. to 700 p.s.i.

6. A motor vehicle wall product including:
   a fiberglass sheet having a first surface and a second surface; and
   a compressed bonding sheet adhering to the second surface, such bonding sheet comprising, by weight, between 25% and 60% resin and between 75% and 40% paper.

7. The product of claim 6 wherein the compressed bonding sheet comprises, by weight, between 38% and 42% resin and between 62% and 58% paper.

8. The product of claim 1 wherein:
   the compressed bonding sheet has first and second faces; and
   the tensile strength of the compressed bonding sheet along an axis generally perpendicular to the faces is at least 200 p.s.i.

9. The product of claim 1 wherein:
   the compressed bonding sheet comprises first and second sheet components compressed together; and
   the compressed bonding sheet is substantially free of interstices.

10. The product of claim 8 wherein the tensile strength is in the range of 350 p.s.i. to 700 p.s.i.

11. The product of claim 1 wherein:
    the compressed bonding sheet has first and second faces;
    the first face adheres to the second surface of the fiberglass sheet; and
    a wall rib adheres to the second face of the compressed bonding sheet.

12. A method for making a motor vehicle wall product including:
    providing a fiberglass sheet having a first surface and a second surface;
    providing a compressed bonding sheet comprising, by weight, between 25% and 60% resin and between 75% and 40% paper; and
    adhering the bonding sheet and the second surface to one another.

13. The method of claim 12 wherein the step of providing the bonding sheet includes:
    providing first and second sheet components impregnated with dried, uncured resin;
    pressing the sheet components together while heating them, thereby curing the resin and making the compressed bonding sheet.

14. The method of claim 13 wherein:
    the compressed bonding sheet comprises, by weight, between 25% and 44% resin and between 75% and 56% paper.

15. The method of claim 14 wherein the compressed bonding sheet comprises, by weight, between 38% and 42% resin and between 62% and 58% paper.

16. The method of claim 13 wherein the compressed bonding sheet has first and second faces, and the pressing step is followed by the step of:
    sanding at least the first face.

17. The method of claim 16 wherein the sanding step includes sanding both faces.

18. A method for making a motor vehicle wall product including:
    providing a fiberglass sheet having a first surface and a second surface;
    providing a generally flat bonding sheet comprising, by weight, between 25% and 60% resin and between 75% and 40% paper, the bonding sheet having first and second faces; and
    adhering the first face of the bonding sheet and the second surface to one another.

19. The method of claim 18 wherein the bonding sheet is a natural bonding sheet and comprises, by weight between 35% and 60% resin and between 65% and 40% kraft paper having interstices, thereby permitting an adhesive to penetrate the paper.

20. The method of claim 19 wherein the natural bonding sheet comprises, by weight between 38% and 42% resin and between 62% and 58% paper.

21. The method of claim 19 wherein:
    the tensile strength of the natural bonding sheet along an axis generally perpendicular to the faces is at least 200 p.s.i.

22. The method of claim 20 wherein the tensile strength is in the range of 350 p.s.i. to 600 p.s.i.

23. The method of claim 18 wherein the adhering step is followed by the step of:
    adhering a wall rib to the second face of the natural bonding sheet.

24. A motor vehicle wall product in combination with insulation, a plurality of wall ribs and an interior finishing product including:
    a fiberglass sheet having a first surface and a second surface;
    a bonding sheet adhering to the second surface, such bonding sheet comprising, by weight, between 25% and 60% resin and between 75% and 40% paper; and
    wherein:
    the bonding sheet is a first bonding sheet;
    the insulation and ribs adhere to the first bonding sheet and define a finish bonding surface; and
    an interior finishing product adheres to the finish bonding surface, such finishing product including a finishing bonding sheet adhering to the finish bonding surface and a decorative vinyl lamination adhering to the finishing bonding sheet, thereby providing a motor vehicle wall.

* * * * *